Jan. 10, 1939.   C. W. BAKER   2,143,402
LAWN MOWER RAKE
Original Filed May 12, 1937   2 Sheets-Sheet 2
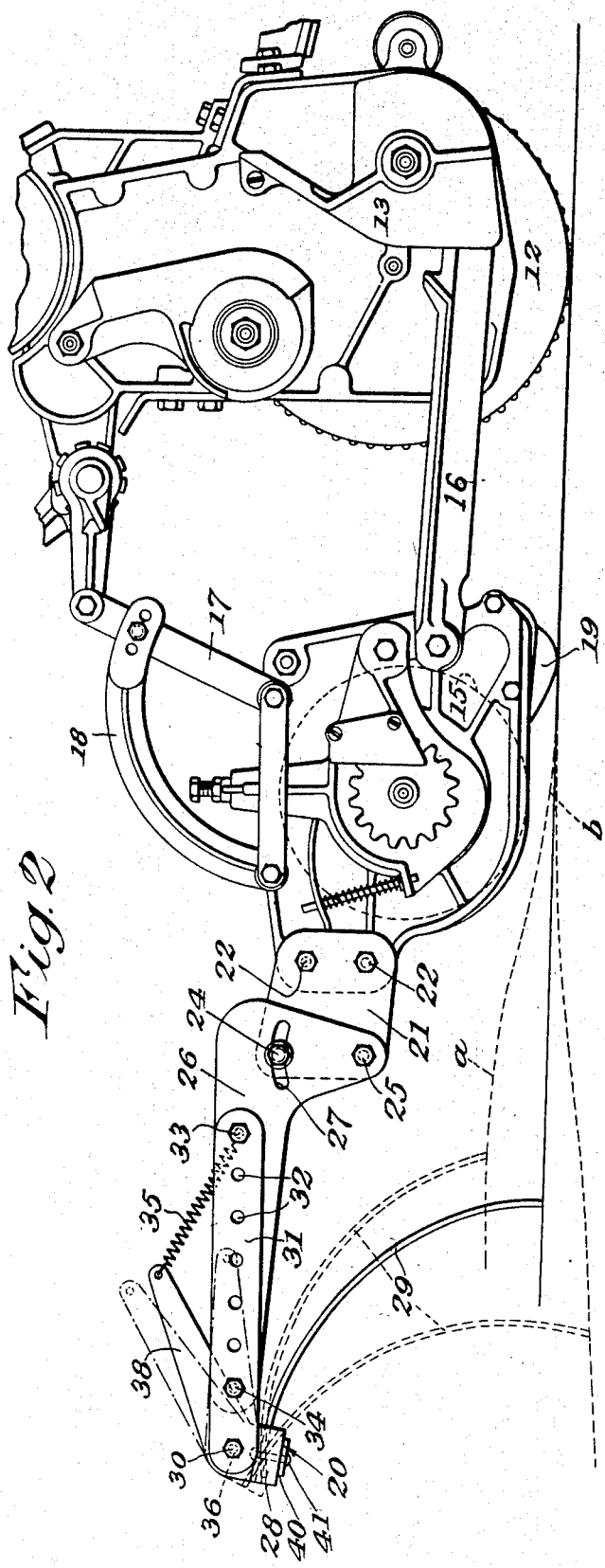
INVENTOR
*Chauncey W. Baker*
BY
*C. M. Newman*
ATTORNEY Patented Jan. 10, 1939

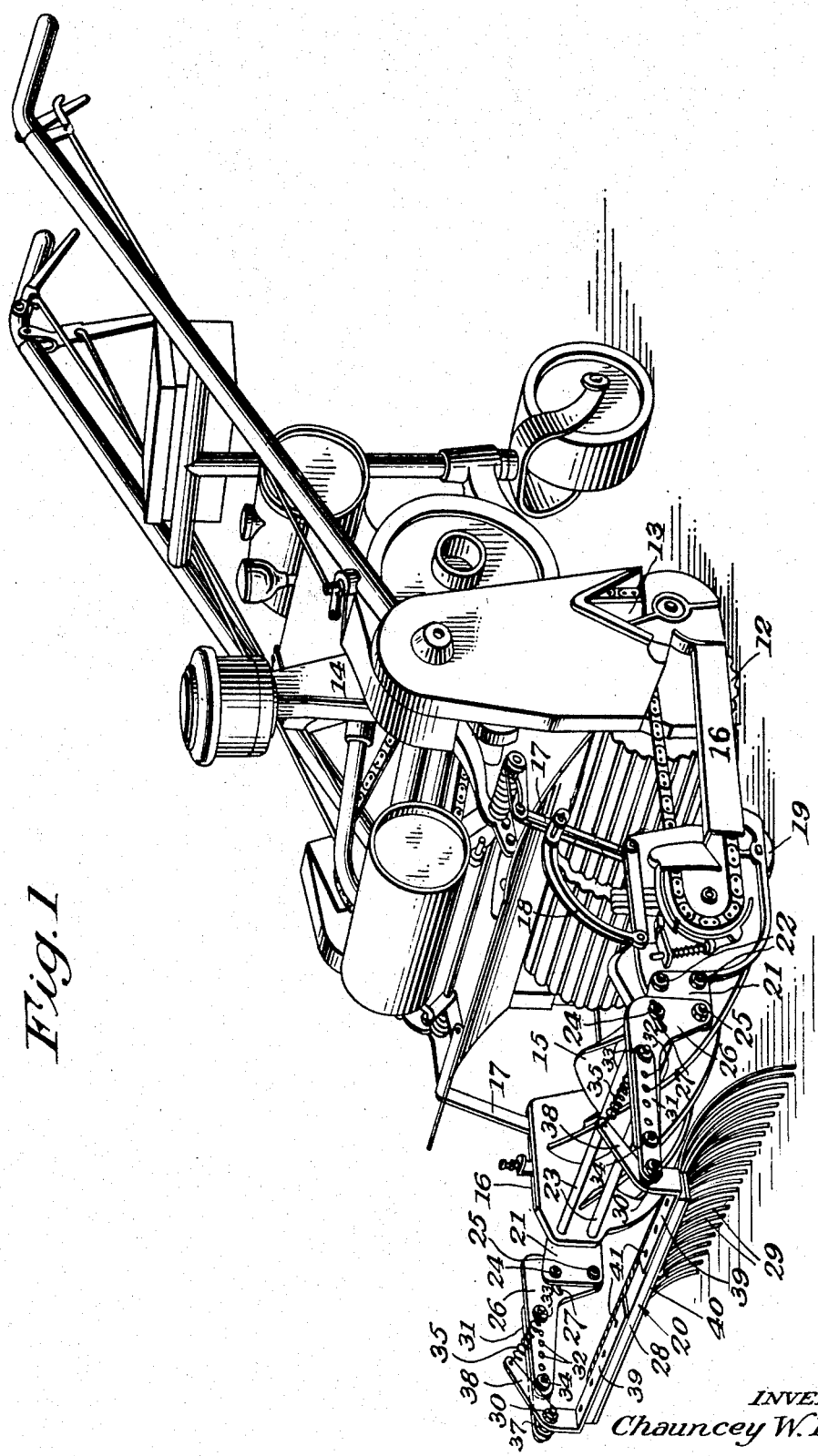

2,143,402

UNITED STATES PATENT OFFICE 2,143,402

LAWN MOWER RAKE

Chauncey W. Baker, Bridgeport, Conn., assignor to The Locke Steel Chain Company, Bridgeport, Conn., a corporation of Connecticut Refiled for abandoned application Serial No. 142,149, May 12, 1937. This application February 3, 1938, Serial No. 188,509

5 Claims. (Cl. 56—249)

The purpose of this invention is primarily to provide a lawn mower with means to insure a smooth or level cut on a poorly graded lawn, abounded with short undulations, and is at its best when used on the type of mower described in Patent No. 1,886,408.

As shown in the accompanying drawings forming a part of this specification, a leveling rake attachment is applied directly forward of the cutting reel, which in turn is positioned forward of the traction rollers, and is adapted to be adjusted and set at different distances from the axis of the cutting reel as well as at different elevations from the ground according to the conditions of the lawn to be mowed.

Objects of the invention will be noted from the following description and accompanying drawings, and will be pointed out in the claims to follow, wherein I have disclosed a structure carrying out the objects of the invention, yet it will be understood that the invention is not confined to the exact features shown as changes may be made within the scope of the claims.

In the drawings:

Fig. 1 shows a perspective view of a commercial type of power driven lawn mower having my improved rake attachment applied thereto.

Fig. 2 shows an enlarged side elevation of the lower forward portion of the machine shown in Fig. 1 illustrating several different positions of the spring teeth with respect to variations in the surface of a lawn, as shown in dotted lines.

Fig. 3 shows a top plan view broken away illustrating approximately one-half of my improved rake unit as shown applied to the forward portion of the mower in Figs. 1 and 2, and Fig. 4 shows a cross sectional detail on an enlarged scale of the cross head supporting the teeth, and lever for rocking the same.

Referring in detail to the characters of reference marked upon the drawings, attention is first directed to Fig. 1 which shows a commercial type of power driven lawn mower, similar to that shown in prior patent above referred to and to which my improved rake attachment is shown applied.

In Figs. 1 and 2 of the drawings, 12 represents ground engaging tractor wheels or rollers and 13 the general frame structure which in part is supported by said wheels, and serves to carry a motor 14 that is mounted to drive the tractor rollers and cutting element through suitable sprocket chain connections. This machine as illustrated includes a cutting unit 15 that is positioned forward of the traction rollers and is full floating, being connected to the main frame of the machine by suitable distance links 16 and carrying links 17. The vertical alignment of the cutting unit is maintained by the quadrant 18. The gauge shoe 19 slides on the lawn, determines the length to which the grass is cut, and carries the weight of the cutting unit while the same is in operation.

In as much as the two side portions of the rake attachments are substantially the same in construction, like characters of reference will be used to designate corresponding parts as used in the two side portions.

The rake 20 if preferably attached to the cutting unit by plates 21—21 which are secured to each side of the cutting unit by long bolts 22 which are provided with spacing sleevs 23, see Figs. 1 and 3. Bolts 24 and 25 pass through the forward portion of plates 21 for the attachment of forwardly disposed arms 26. A circular slot 27 in arm 26 permits the arm to be swung on pivot bolt 25 to raise or lower the rake head 28 which detemines the working angle of the rake teeth 29 and their pivot bolts 30. These teeth are individually resilient and carried at a rearwardly disposed angle. The arms 26 are each provided with an extendable side plate 31 having a series of holes 32 therethrough for their adjustable connection to the said side arms, the two said members 26 and 31 being detachably secured together by screw bolts 33 and 34 which, as shown in the drawings, are positioned in holes in the arms 26 and extendable side plate 31 so as to form a means for lengthening or shortening the arms 26. The rake head is pivotally mounted as by means of bolts 30 to permit spring loading. It is in the same manner adjustable vertically to vary the angle of the teeth, and adjustable horizontally for distance, from the gauge shoe, to suit the average undulations in the lawn.

The rake is loaded at the pivot 30 by a spring 35 which normally holds the teeth in a vertical position. As the pivot 30 is lowered or the ends of the teeth raised, this spring is extended and grows stronger and consequently the pressure of the teeth on the lawn or ground increases. When the pivot is raised, the spring contracts and becomes weaker and the pressure of the rake teeth on the ground decreases.

The spacing of the rake from the gauge shoe should be such that when the rake teeth are on the apex of the average undulation $a$ the gauge shoe is in the depression $b$, and when the rake teeth are in a depression the gauge shoe would be on an undulation.

From the above it will be seen that if it is desired to extend the arms through the repositioning of the side plates 31 it would first be necessary to remove the screws 33 and 34 and adjust the plates forward one or more holes as might be necessary to provide the desired length of arm, after which the screws 33 and 34 would be repositioned in other holes and secured in a manner to bring the forward end of the attached plates 31 a few inches further forward together with the spring teeth carried thereby. The forward end portion of these side plates are also each provided with a hole 36 to receive the pivot screw bolts 30 and upon this screw bolt is positioned a sleeve 37 one end of which abuts against the said plate 31 and the other against a bell crank arm 38 that is hingedly supported on the before mentioned bolt 30. These arms normally project up slightly more or less above the level of the arm 26 and have their short arm portions deflected down and extended inward at a right angle forming a covering plate 39 for the rake head and covering the butt end of the curved spring wire teeth 29 whose free ends project rearward and downward. The attached end of the teeth are positioned upon a cross member or rake head 28 which may be formed of wood. A metal stiffening plate 40 may also be carried across the under face of this cross member for strengthening purposes and a series of rivets 41 positioned through the three said members 39, 28 and 40 and are headed to form a secure assembly and firm attachment of the rake teeth.

Tension springs 35 have one end secured to the outer end of the arm 38 and the other to the screw 33 to provide a tension sufficient to hold the lower end of the teeth 29 in close engagement with the surface of the ground. In this respect it will be noted that in the adjustment of the side plates 31 the screw 33 may be positioned in any one of the holes 32 which may provide the required change of tension of spring 35 and the rake teeth.

Since the gauge shoe of the lawn mower is traveling on a resilient surface (lawn grass), it is apparent that a heavy load on the gauge shoe will make a short cut and a light load on the gauge show will make a long cut.

When the machine is traveling on a level surface, the loading spring is adjusted to carry a portion of the weight of the cutting unit on the angular rake teeth. When the rake teeth drop in a depression or the gauge shoe mounts a hump in the lawn, the tension on the loading spring and the pressure on the rake teeth decrease, the pressure on the gauge shoe increases, deflecting the grass on the hump more than normally, thus this grass is cut shorter than normal. When the rake teeth are on a mound and the gauge shoe is in a depression, the tension on the loading spring and the pressure on the rake teeth increase while the pressure on the gauge shoe decreases and the cutting unit floats over the depression and cuts the grass longer than normal in the depression, thus tending to make a smooth or level surface on the cut lawn.

Having thus described my invention what I claim and desire to secure by Letters Patent is:

1. A rake attachment for lawn mowers comprising spaced apart supporting arms for attachment to opposite sides of the front portion of a lawn mower, a rake head rockably mounted intermediate the forward ends of said supporting arms, a series of individually yieldable bowed spring teeth carried by and deflected downward and rearward from said rake head, spring means connecting the said supporting arms and the rake head for rocking the same to hold the teeth in yieldable engagement with the surface of the ground over which they are drawn.

2. A rake attachment for lawn mowers comprising spaced apart supporting arms for adjustable attachment to opposite sides of the front portion of a lawn mower, replaceable bolts for adjustably securing said arms in raised or lowered positions, an aligned extension plate coextensively secured to each of said arms, a rake head rockably mounted intermediate the forward ends of said extension plates and carrying a series of downwardly and rearwardly extended bowed spring teeth, spring means connecting the said supporting arms and the rake head for rocking the same to hold the teeth in yieldable engagement with the surface of the ground over which they are drawn.

3. A rake attachment for lawn mowers comprising a pair of spaced apart supporting arms attached to opposite sides of the front portion of a lawn mower, a rake head rockably mounted to and between the forward end portions of the two said supporting arms and carrying a series of downwardly and rearwardly extended bowed spring teeth, an arm extended upwardly from each end of said rake head, a spring connecting each of said upwardly extended arms and the supporting arms for yieldably holding the rearwardly projecting ends of the spring teeth in yieldable engagement with the surface of the ground.

4. A rake attachment for lawn mowers comprising spaced apart supporting arms for attachment to opposite sides of the front portion of a lawn mower, aligned extension plates secured to each of said arms, replaceable bolts for adjustably securing the extension plates to the supporting arms, a rake head rockably mounted intermediate the forward end of said extension plates and carrying a series of downwardly and rearwardly extended bowed spring teeth, said rocker head having an upwardly projected arm, a spring interposed between said arm and the supporting arm to insure yieldable engagement of the teeth with the ground over which the rake is drawn.

5. A rake attachment for lawn mowers comprising spaced apart forwardly projected supporting arms for attachment to opposite sides of the front portion of a lawn mower, an extension plate coextensively secured to each of said arms, a rake head rockably mounted intermediate the forward ends of said extension plates and carrying a series of downwardly and rearwardly extended bowed spring teeth, said rake head having upwardly projecting arms a spring interposed between the free ends of said upwardly extended arms of the rake head and the supporting arms, and replaceable bolts for adjusting the tension of said springs.

CHAUNCEY W. BAKER.